United States Patent [19]
Duback et al.

[11] Patent Number: 5,454,780
[45] Date of Patent: Oct. 3, 1995

[54] CUSTOM BODY PROTECTIVE DEVICE WITH VARIABLE REENFORCEMENT

[75] Inventors: Jeff Duback, Davidson; Eric Vaughter; Bruce Parker, both of Charlotte, all of N.C.

[73] Assignee: Parker Medical Associates, Charlotte, N.C.

[21] Appl. No.: 252,740

[22] Filed: Jun. 2, 1994

Related U.S. Application Data

[63] Continuation-in-part of Ser. No. 860,005, Mar. 30, 1992, abandoned.

[51] Int. Cl.⁶ ........................................................ B32B 7/00
[52] U.S. Cl. ................................ 602/8; 602/6; 602/27; 220/438; 428/68; 428/76; 428/102; 428/192; 428/193; 428/246; 428/251; 428/253; 428/285
[58] Field of Search ................................ 602/5, 6, 8, 27; 428/246, 251, 285, 102, 253, 192, 193, 68, 76

[56] References Cited

U.S. PATENT DOCUMENTS

| | | | |
|---|---|---|---|
| 4,411,262 | 10/1983 | von Bonin et al. | 128/90 |
| 4,770,299 | 9/1988 | Parker | 206/409 |
| 4,869,046 | 9/1989 | Parker | 53/416 |
| 4,899,738 | 2/1990 | Parker | 128/90 |
| 5,003,970 | 4/1991 | Parker et al. | 128/90 |

FOREIGN PATENT DOCUMENTS

| | | |
|---|---|---|
| 061642 | 10/1982 | European Pat. Off. . |
| 286426 | 10/1988 | European Pat. Off. . |

*Primary Examiner*—James J. Bell
*Attorney, Agent, or Firm*—W. Thad Adams, III

[57] ABSTRACT

A multi-layer protective pad for being custom-fitted to a body member to be protected which includes a flexible inner cushion layer for being placed closest to the body member and an initially flexible intermediate layer bonded to the inner layer. The intermediate layer includes a fabric impregnated with a moisture-curable resin which hardens upon curing to form a rigid structure of the fabric which retains a body part-defined shape into which it is molded during curing, thereby also holding the flexible inner cushion layer in the same body-part defined shape. The fabric has a variable thickness with a relatively thick predetermined area where increased rigidity is desirable and a relatively thin area where increased flexibility is desirable. A flexible outer layer is bonded to the intermediate layer for being held by the intermediate layer in the same body-part defined shape as the intermediate layer.

17 Claims, 11 Drawing Sheets

CUSTOM BODY PROTECTIVE DEVICE WITH VARIABLE REENFORCEMENT

TECHNICAL FIELD AND BACKGROUND OF THE INVENTION

This application is a continuation-in-part of application Ser. No. 860,005, filed on Mar. 30, 1992 now abandoned.

This invention relates to a custom-fitted body protective device such as a shin, thigh, or arm pad used to protect against injuries to sports participants, and to protect previous injuries which sports competition continues. The particular embodiments shown in the application include protectors for the lower portion of the leg, and include protectors of the type to be used by soccer players during competition. The invention has application in any field—including non-sports related activities—which require or make desirable an accurate custom fit between the protective device and the body member. The invention takes advantage of polymer chemistry to permit quick and easy molding of a pad to the body part to be protected. Shock attenuation is increased since the custom fit provides spreads contact between the protective device and the body member over a wider surface area.

Prior art body protectors include numerous types of guards which are fitted over the body part, such as the shin. These devices typically include a soft component to place near the skin and a hard, shell-like outer cover. The soft component is intended not only to provide a cushion, but also to accommodate itself to the varying configurations of differing sized and shaped body parts. For this reason, the cushioned part is substantially greater in thickness than required merely to provide the required amount of shock attenuation. Such devices are sufficiently "generic" that they are required to be held in place by straps or bands.

Other prior art devices include pads which are constructed of thermo-setting materials, which are heated and then formed to the body while heated. These products require a source of heat, and are susceptible to either over-or-underheating. In addition, body heat itself can soften or at least increase the flexibility of the pad, thereby decreasing the effectiveness of the protection offered by the pad. Some prior art pads include air bladders which provide an air cushion against injurious blows. Other prior art devices have a plurality of connected-together segments which are hinged for limited movement relative to each other, on the theory that such movement permits the pad to more closely conform to the body part. All of these prior art devices achieve only an approximation of a truly proper and anatomically correct fit.

The present invention permits quick and easy application of a protective pad to a body part in such a way as to achieve a true custom fit. The moisture curable resin system used results in a very rigid pad, which holds the shape of the molded pad to a very high degree. No heat is required, and a source of water is the only additional substance necessary to achieve a cure. Atmospheric moisture alone will cure the pad into its hardened position in a relatively short period of time, but the resin in or on the pad will typically be activated by dipping in water.

SUMMARY OF THE INVENTION

Therefore, it is an object of the invention to provide a body protective pad which can be molded to a body part to be protected.

It is another object of the invention to provide a body protective pad which has variable reenforcement for permitting greater rigidity in some areas of the pad than in others.

It is another object of the invention to provide a body protective pad which hardens in the presence of moisture to form a very rigid but very lightweight protective pad.

It is another object of the invention to provide a body protective pad which can easily be cut to the desired shape needed for the pad.

It is another object of the invention to provide a body protective pad which can be worn without the need for the pad to be held into place by straps or belts.

It is another object of the invention to provide a body protective pad which is stored in a moisture-proof pouch until ready for application to the body part to be protected.

It is another object of the invention to provide a body protective pad which is cut from a long roll of pad material stored in a moisture-proof elongate pouch which can be rolled into a coil.

It is another object of the invention to provide a body protective pad which is suitable for protecting against injury, and protecting injuries against further damage.

These and other objects of the present invention are achieved in the preferred embodiments disclosed below by providing a multi-layer protective pad for being custom-fitted to a body member to be protected which includes a flexible inner cushion layer for being placed closest to the body member and an initially flexible intermediate layer bonded to the inner layer. The intermediate to layer is comprised of a fabric impregnated with a moisture-curable resin which hardens upon curing to form a rigid structure of the fabric which retains a body part-defined shape into which it is molded during curing, thereby also holding the flexible inner cushion layer in the same body-part defined shape. The fabric has a variable thickness with a relatively thick predetermined area where increased rigidity is desirable and a relatively thin area where increased flexibility is desirable. A flexible outer layer is bonded to the intermediate layer for being held by the intermediate layer in the same body-part defined shape as the intermediate layer.

According to one preferred embodiment of the invention, the fabric comprises a plurality of overlaid thicknesses of fiberglass.

According to another preferred embodiment of the invention, the plurality of thicknesses of fiberglass comprises at least five thicknesses and no more than seven thicknesses.

According to yet another preferred embodiment of the invention, the fiberglass thicknesses are sewn together with stitches in order to provide stability to the protective pad during molding.

According to yet another preferred embodiment of the invention, the stitches extend along the length of the intermediate layer closer to one side edge of the intermediate layer than the other.

According to yet another preferred embodiment of the invention, the stitches are sufficiently loosely placed in the intermediate layer to permit substantial shifting of the individual layers relative to each other as the intermediate layer is formed around the body part to be protected.

According to yet another preferred embodiment of the invention, the intermediate layers of fiberglass include at least one relatively wide layer, at least one intermediate layer residing next to the relatively wide layer and having a width no more than 90 percent of the relatively wide layer, and at least one relatively narrow layer residing next to the intermediate layer and having a width no more than 90 percent of the intermediate layer.

According to yet another preferred embodiment of the invention, the intermediate layer has a width of no more than 80 percent of the relatively wide layer, and wherein the relatively narrow layer has a width of no more than 80 percent of the intermediate layer.

Preferably, the intermediate layer has a width of no more than 60 percent of the relatively wide layer, and wherein the relatively narrow layer has a width of no more than 67 percent of the intermediate layer.

According to one preferred embodiment of the invention, the relatively wide, intermediate and relatively narrow layers are positioned to be conformed around a generally cylindrical body part such as a leg or arm to define a convex first major surface residing adjacent the body part and a concave second major surface residing remote from the body part, the relatively wide layer residing on the surface of the convex major surface and the relatively narrow layer residing on the concave major surface.

According to another preferred embodiment of the invention, the pad includes a supplemental reenforcement area defined by a plurality of overlying supplemental layers of fiberglass.

According to yet another preferred embodiment of the invention, the body protective pad comprises a shin guard, the shin guard having a relatively narrow center portion for being placed on and formed to the shin and first and second integrally-formed side portions extending outwardly from the center portion for being placed on and formed to the leg on opposing sides of the shin.

According to yet another preferred embodiment of the invention, the shin guard includes strap means attached thereto for securing the shin guard around the leg.

According to yet another preferred embodiment of the invention, the protective pad includes a pad cover for enclosing the protective pad and holding it in place on the body part. The cover comprises a front and back fabric layers connected together to form a double layer fabric structure, access means formed in the pad cover to permit insertion of and removal from the pad cover of the body protective pad, and strap means attached thereto for securing the pad cover and the protective pad therein on the body part to be protected.

According to yet another preferred embodiment of the invention, the invention includes closure means for closing the access means to trap the protective pad therein.

According to yet another preferred embodiment of the invention, the protective pad comprises an achilles tendon protector for being placed on and formed to the back of the foot in the area of the achilles tendon.

According to yet another preferred embodiment of the invention, a multi-layer protective pad assembly is provided for preparing a protective pad custom-fitted to a body part to be protected which comprises a flexible inner cushion layer for being placed closest to the body member and an initially flexible intermediate layer bonded to the inner layer. The intermediate layer comprises a fabric impregnated with a moisture-curable resin which hardens upon curing to form a rigid structure of the fabric which retains a body part-defined shape into which it is molded during curing, thereby also holding the flexible inner cushion layer in the same body-part defined shape. The fabric has a variable thickness with relatively thick a predetermined area where increased rigidity is desirable and a relatively thin area where increased flexibility is desirable. A flexible outer layer is bonded to the intermediate layer for being held by the intermediate layer in the same body-part defined shape as the intermediate layer. A moisture-proof protective pouch is provided within which the other elements are sealed in the absence of moisture until the time the pad is to be molded to the body part to be protected.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
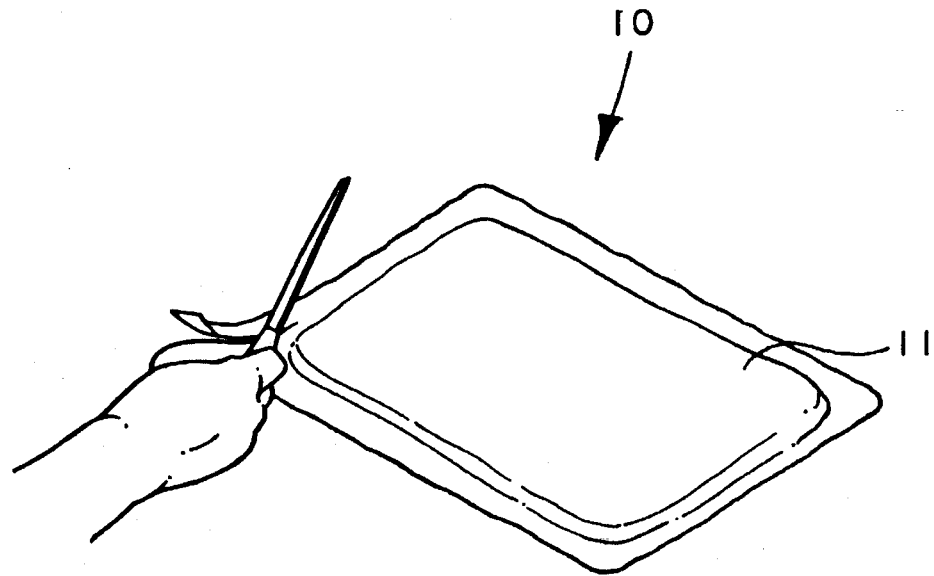
FIG. 1 is a perspective view showing the packaging within which the protective pads according to the invention may be stored until use.
Figure 2:
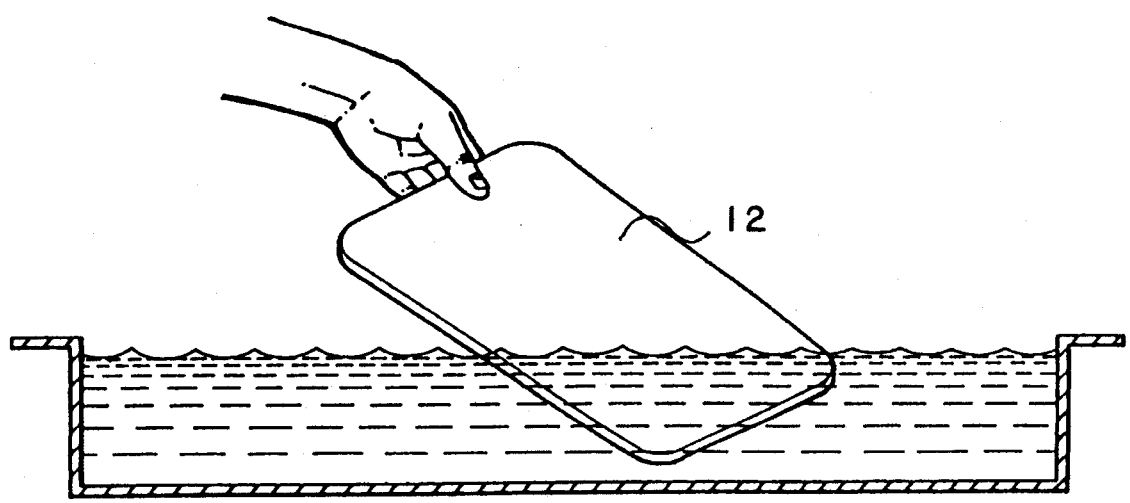
FIG. 2 illustrates that the protective pad is wetted in water before application.
Figure 3:
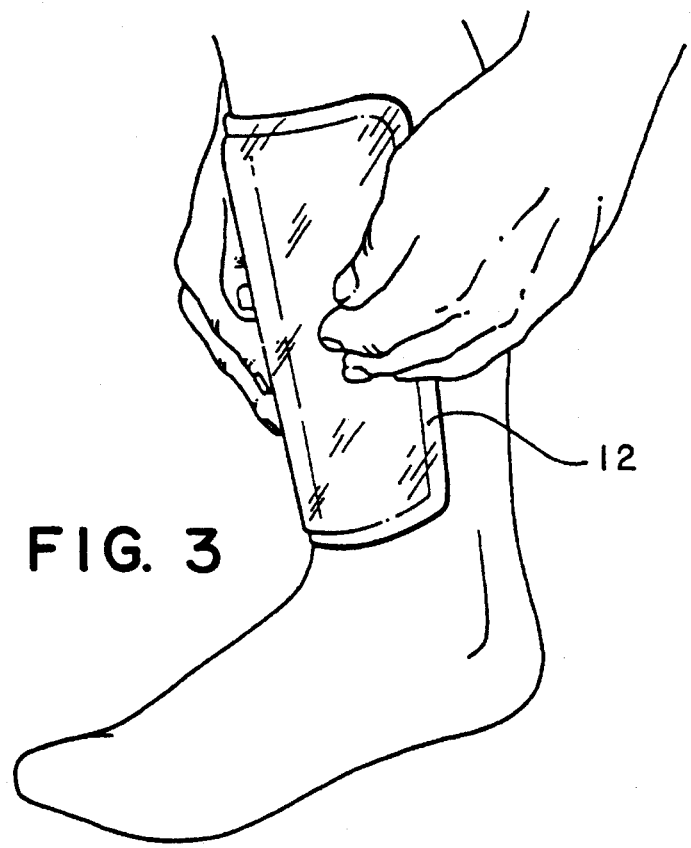
FIGS. 3, 4 and 5 are sequential perspective views of a protective pad according to one embodiment of the invention being molded to the lower part of the leg.
Figure 4:
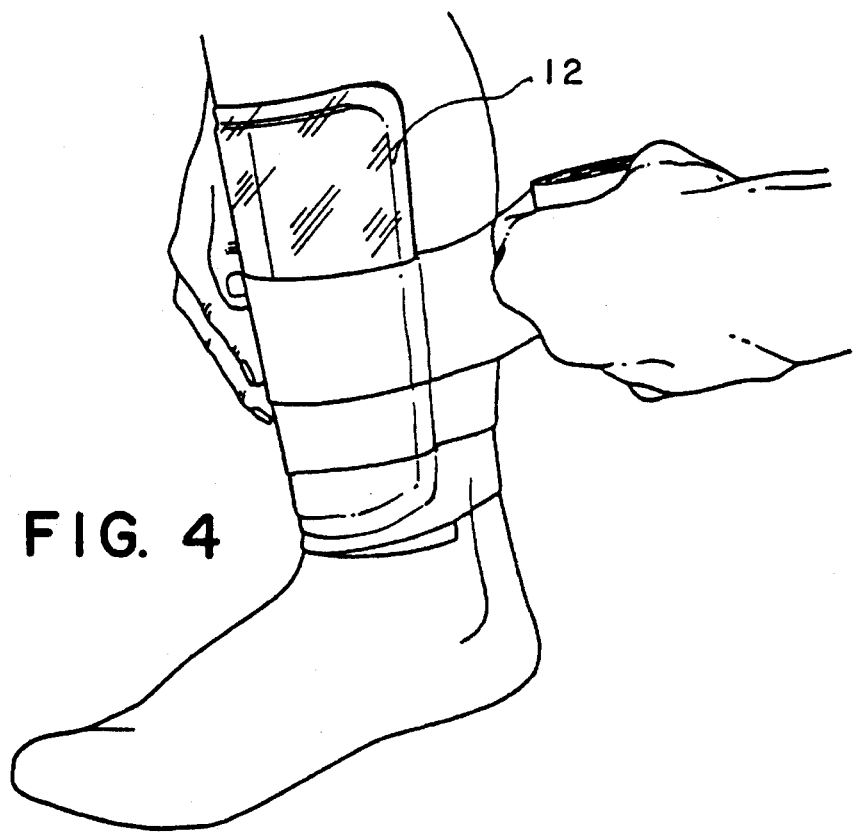

Referring now specifically to the drawings, FIGS. 1–5 illustrate protective pad assembly according to an embodiment of the invention. In general, to create the custom body protective device according to any of the particular embodiments disclosed in this application, a protective pad assembly 10 is utilized. A moisture-impervious foil and plastic laminated pouch 11 is opened with scissors or a knife, as shown in FIG. 1, and the protective pad 12 is removed. As is shown in FIG. 2, the pad 12 is dipped in water to activate the moisture-curable resin with which the pad is impregnated or coated. The wet pad 12 is then applied to the body part to be protected. As is shown in FIG. 3, the pad 12 is applied to the shin of the leg and held there while it is overwrapped with, for example, an elastic bandage, as is shown in FIG. 4. The pad 12 will harden within a matter of minutes, and will retain the conformation in which it was held during curing.

The pad 12 can be worn directly next to the skin and under, for example, a game sock. Since the pad 12 was molded directly next to the skin, the fit is virtually perfect, and fits so well that straps or belts are not ordinarily needed. The pad 12 is held in place by the sock and the adherence of the pad 12 to the corresponding shape of the shin.

Figure 5:
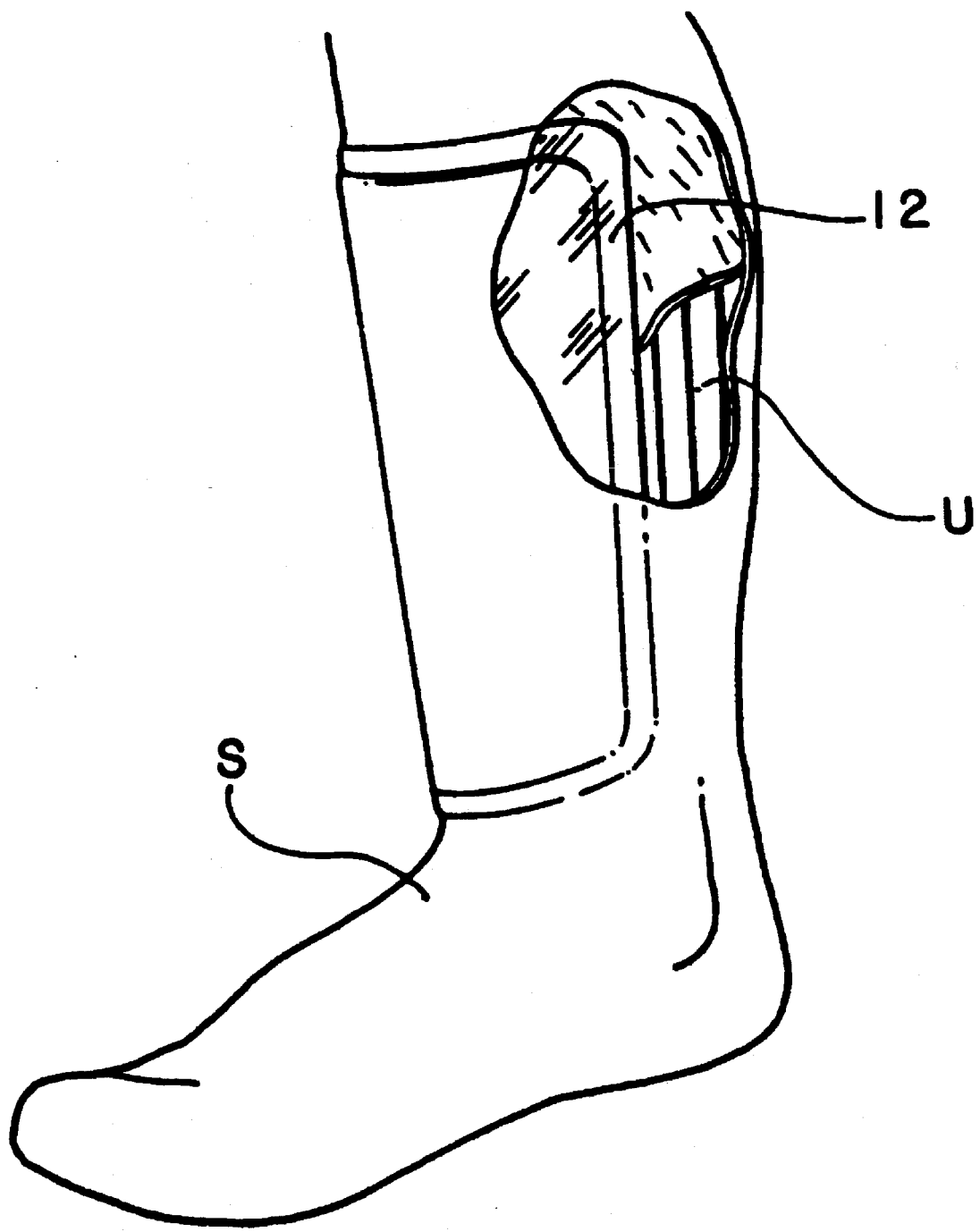

Alternatively, the pad 12 can be worn over an undersock "U" and under a game sock "S" as is shown in FIG. 5. Ordinarily, pad 12 will fit acceptably over the undersock "U" even if molded directly over the skin. However, the pad 12 can be molded onto the shin while the wearer is wearing an undersock, if the pad 12 is to be normally worn over an undersock.

Alternatively, an integral, long strip of multi-layer material in the form of an elongate pad member may be sealed after fabrication into a moisture-proof pouch. (Not shown). The pouch can be sealed against moisture intrusion between uses by a clamp.

When needed, the clamp is released and the elongate pad member is pulled through the pouch opening and cut to separate a single body protective pad from the elongate pad member. Thereafter, the pad member is used as described above with reference to FIGS. 2–5.

Figure 6:
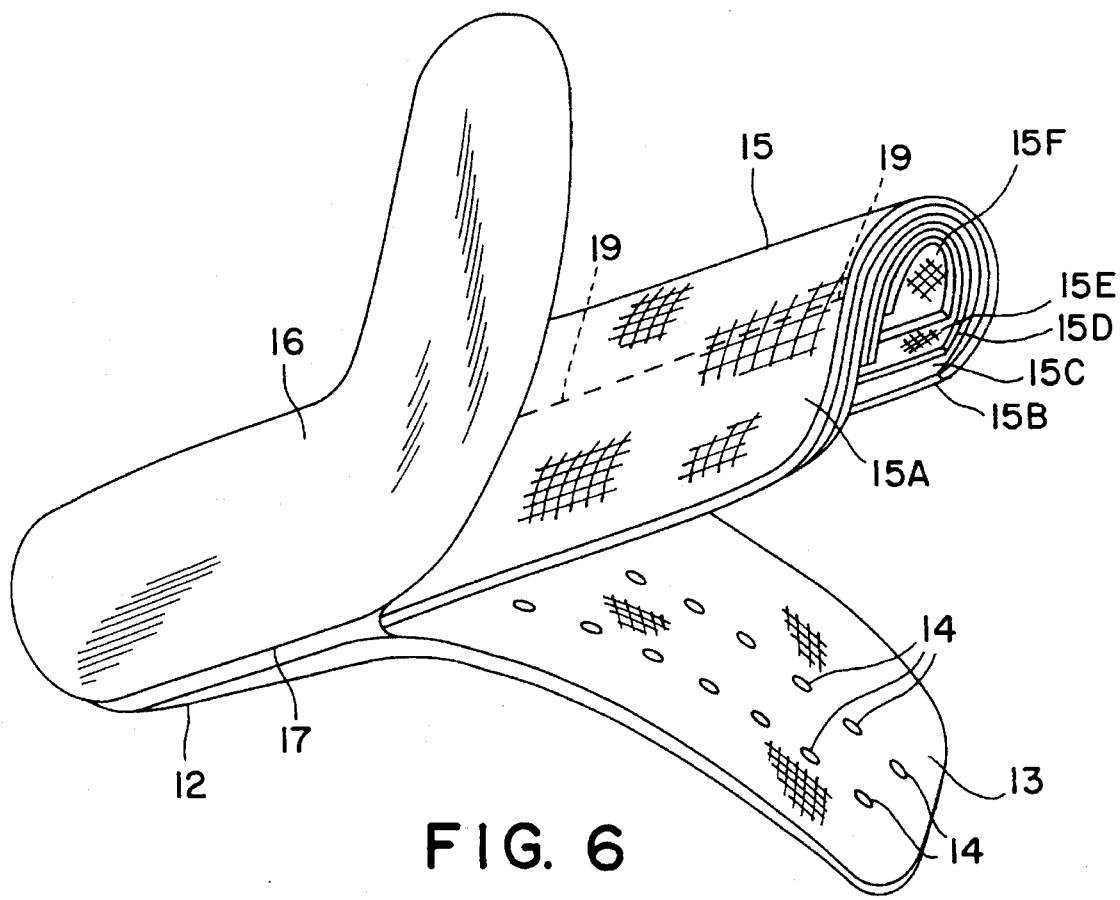
FIG. 6 is a perspective view of a partially-disassembled protective pad embodiment according to an embodiment of the invention.

Referring now to FIG. 6, the pad 12 is illustrated and described more specifically. Pad 12 is shown in its molded configuration after the steps carried out as described with reference to FIGS. 1–5. Pad 12 is a multi-layer protective pad for being custom-fitted to a body member to be protected, for example, the shin of the leg. A flexible inner cushion layer 13 is provided for being placed closest to the body member. Inner cushion layer 13 is preferably a laminated one-eighth inch, six pound EVA (ethylene vinyl acetate) with a heavy knitted covering, such as a product known as Tietex. Other thicknesses and weights of cushioning, both laminated and unlaminated, can also be used. Holes 14 are provided for ventilation. The cushioning provides a comfortable surface next to the skin or under sock. The EVA is flexible enough to bend easily with the other components of the pad 12.

An initially flexible intermediate layer 15 is bonded to the inner cushion layer 13. The intermediate layer 15 is preferably formed of fiberglass fabric impregnated with a moisture-curable resin which hardens upon curing to form a rigid structure which retains shape of the body part onto which it is molded during curing.

The fiberglass fabric is impregnated or coated with a moisture-curable resin such as polyisocyanate as described in full in the present applicant's U.S. Pat. No. 4,770,299. This reactive system remains stable when maintained in substantially moisture-free conditions, such as in the moisture-impervious pouch 11, but hardens upon exposure to sufficient moisture to form a rigid, self-supporting structure. A typical formulation of the reaction system is set forth in the following table:

Typical Formulation:

| Isonate↓ 143L | or | | |
|---|---|---|---|
| Mondur↓ CD | or | polyisocyanate | 50.0% |
| Rubinate ↓ XI168 | | | |
| Pluracol↓ P1010 | | polyol | 46.6% |
| DC-200 Silicone | | defoaming agent | 0.30% |
| Benzoyl Chloride | | stabilizer | 0.10% |
| Thancat↓ DM-70 | | catalyst | 3.0% |

-continued

Typical Formulation:

| | 100% |
|---|---|

A complete discussion of the parameters of the reactive system, the manner of production and the variables which apply are found in U.S. Pat. No. 4,411,262.

The polyisocyanate resin remains in a viscous, liquid unhardened state so long as the resin is not exposed to moisture. This permits the fiberglass intermediate layer 15 and any flexible structure, such as the inner cushion layer 13, bonded to the fiberglass to remain flexible and moldable so long as the resin is not exposed to moisture, and for a relatively short period of time after exposure to moisture. The curing time can be controlled to some extent by the quantity of water to which the resin is exposed. For example, exposure to water by dipping will result in quite rapid curing, while merely allowing the resin to be exposed to air will cause long curing times proportional to the amount of moisture, i.e., the humidity, in the air to which it is exposed.

In accordance with the invention, the intermediate layer 15 is composed of several individual fiberglass fabric layers 15A–F, which are preferably die-cut to shape. As described below, the various fabric layers 15A–F have different widths, and the degree of overlap and non-overlap resulting from these differing widths has the effect of providing the a variable thickness with a relatively thick predetermined area where increased rigidity is desirable and a relatively thin area where increased flexibility is desirable.

Alternatively, some of the layers 15A–F may be of other material, such as polypropylene, which offers additional flexibility and some cost savings in material.

As is also shown in FIG. 6, a flexible outer layer 16 is bonded to the intermediate layer 15 and is held by the intermediate layer 15 in the same body-part defined shape as the intermediate layer 15. The outer layer 16 is preferably a polyester double-knit fabric having "all way" stretch.

The two outer components of the protective pad 12—the inner cushion layer 13 and the outer layer 16—are seamed together and placed into a closed envelope with a relatively close overedge seam 17, enclosing the intermediate fiberglass layer 15 inside without actually catching the intermediate fiberglass layer within the stitches.

Figure 7:
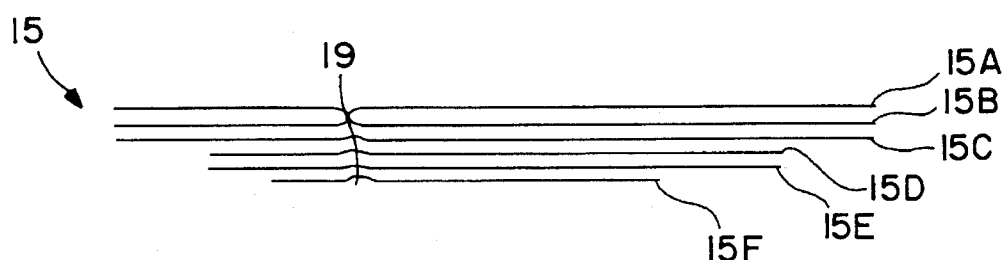
FIG. 7 is a simplified vertical cross-sectional view of the intermediate layers of fiberglass in a protective pad according to an embodiment of the invention.

Referring now to FIG. 7, the intermediate layer 15 shown in FIG. 6 is shown Schematically in cross-section for purposes of further explanation. As noted above, the intermediate layer 15 is formed of six fiberglass layers 15A–F, as described above. The relative widths and dimensions of the layers 15A–F can vary. Generally, the outermost layers 15A–C are the widest—on the order of five inches from side-to-side. The layers 15A–C provide basic strength to the pad 12 from side-to-side while permitting some flexibility.

Layers 15D and 15E are narrower—on the order of four inches wide, and provide additional strength in the central part of the pad 12 while providing some residual flexing.

The single layer 15F is narrower still—three inches—and provides further reenforcement for the center of the pad 12. The thinner side edge areas permit better conformance of the pad 12 to the body member during molding. After curing is complete, the central, longitudinally-extending area of the pad 12 is quite rigid and provides substantial impact resistance, while the edges of the pad 12 retain sufficient flexibility to move minimally if pressure is directly applied. As is shown in FIG. 6, the pad 12 is applied to the leg with the narrowest fabric layer 15F nearest the leg.

Alternatively, the respective differing widths of fabric layers 15A–F can be five inches, three inches and two inches.

As also shown in FIG. 7, sewing stitches 19 bind the six layers 15A–F together into a loosely-held unit which maintains its longitudinal alignment as it is applied to the body part. Looseness is desirable since the intermediate layers 15A–F are intended to be bent into an arc. The collective thickness of the layers 15A–F results in substantial lateral shifting of the fabric layers 15A–F relative to each other. The sewing stitches 19 are applied to the fabric layers 15A–F with only slight tension and relatively widely spaced-apart. A stitch length of from six to 10 stitches per inch will provide sufficient looseness to permit the layers 15A–F to shift laterally relative to each other while maintaining overall longitudinal alignment. Tension should be sufficiently loose so that there is no tendency for the fabric layers 15A–F to be drawn inwardly towards each other by the stitches 19, but conversely, the fabric layers 15A–F maintain the spacing from each other naturally caused by the stiffness, thickness and irregularity of the fabric surfaces. The stitches are put in sufficiently loosely so that there is no tendency for the stitches to perforate the fiberglass fabric layers along the line of the stitching.

Note that the stitches 19 are applied asymmetrically, that is they extend along the length of the pad 12 closer to one side edge of the intermediate layer 15 than to the opposing side edge. This enables the fabric layers 15A–F to shift to a greater degree than if the stitches ran down the center of the intermediate layer 15.

It has been determined that this structure, generally referred to as a "pyramid structure" disperses impact across the width of the body part more efficiently than a pad with multiple layers, all having the same width.

Referring now to FIGS. 8–13, several different constructions of the invention according to the application are illustrated. Each of these constructions contain the same basic three components—the inner layer 13, intermediate layer 15 and outer layer 16—as the pad 12 already described in detail in reference to FIGS. 1–7.

Figure 8:
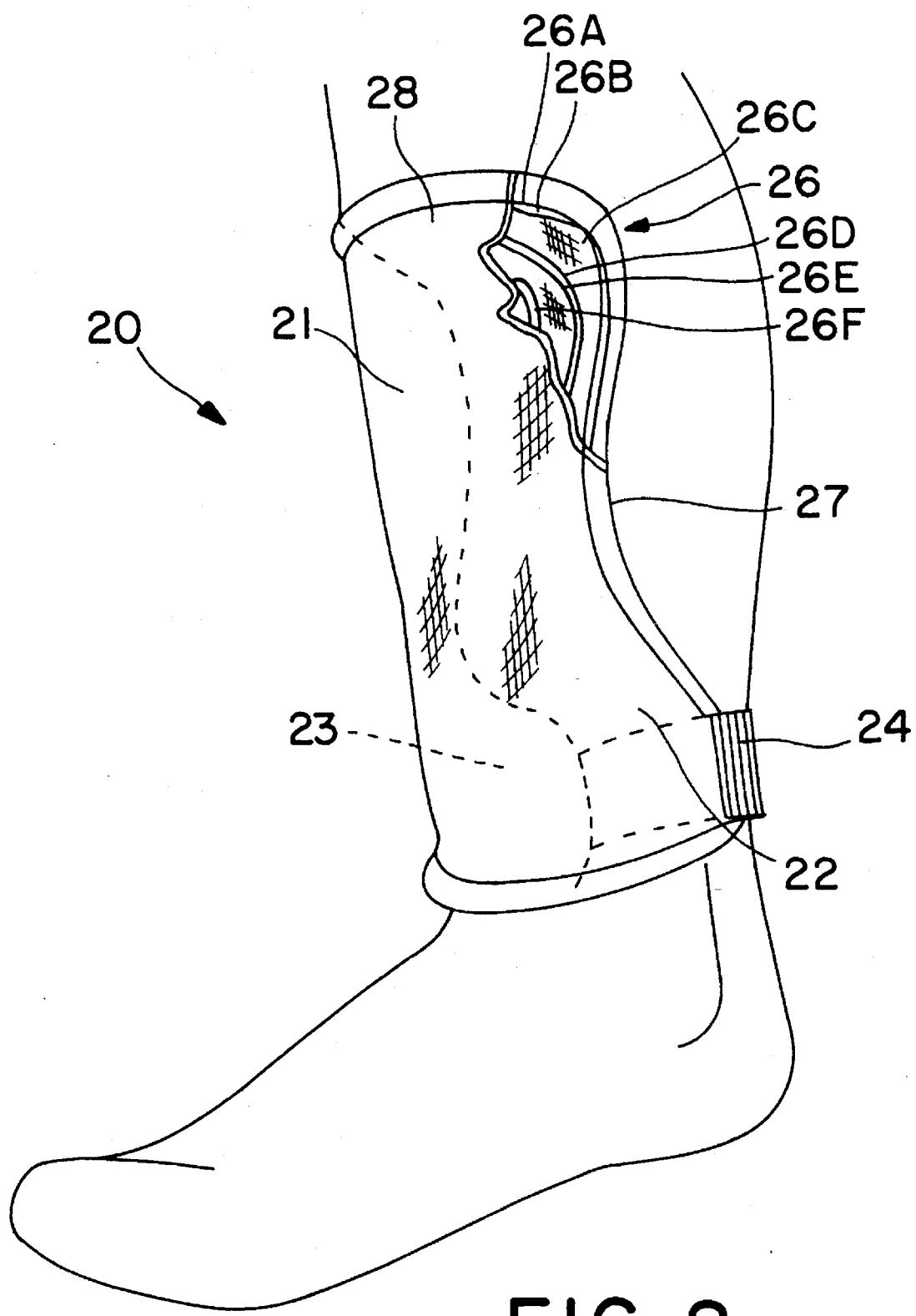
FIG. 8 is a perspective view of another embodiment of the invention.

FIG. 8 illustrates a shin guard 20 with a relatively narrow center portion 21 and two integrally-formed side portions 22 and 23 extending outwardly from the center portion 21 for protecting the opposing sides of the shin. A strap 24 may be used to retain the shin guard 20 snugly on the leg. The strap 24 may be a heavy elastic strap connected to both side portions 22 and 23 which is stretched sufficiently to allow the foot to pass through when the shin guard 20 is being placed on the foot, or a hook-and-loop system, with a small patch of hooks or loops attached to one of the end portions 22 or 23 and the strap having a length of complementary material attached for mating with the patch.

As is shown in FIG. 8, the body of the shin guard 20 has an intermediate layer 26, which is made up of three relatively wide fiberglass layers 26A, B and C, two narrower layers 26D and E, and a narrow central layer 26F. Thus, the shin guard 20 exhibits greater flexibility along the opposing sides than in the middle.

The intermediate layer is sandwiched between an inner cushion layer 27 and an outer layer 28 substantially as described above.

Figure 9:
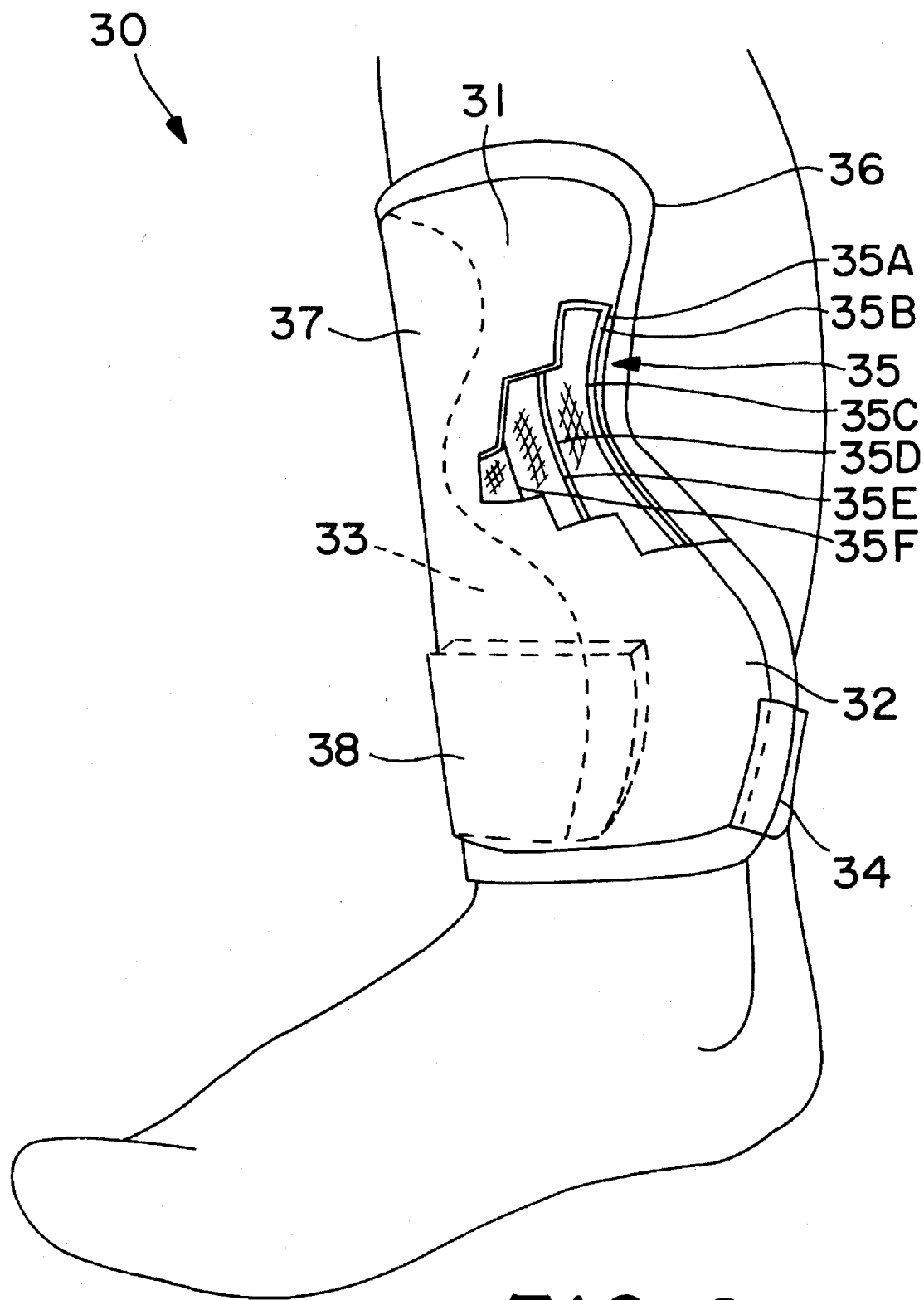
FIG. 9 is a perspective view, with parts broken away, of yet another embodiment of the invention.

FIG. 9 illustrates a shin guard 30 with a relatively narrow center portion 31 and two integrally-formed side portions 32 and 33 extending outwardly from the center portion 31 for protecting the opposing sides of the shin. A strap 34 may be used to retain the shin guard 20 snugly on the leg.

The body of the shin guard 30 has an intermediate layer 35, which is made up of three relatively wide fiberglass layers 35A, B and C, two narrower layers 35D and E, and a narrow central layer 35F. Thus, the shin guard 30 exhibits greater flexibility along the opposing sides than in the middle.

The intermediate layer 35 is sandwiched between an inner cushion layer 36 and an outer layer 37 substantially as described above.

Figure 10:
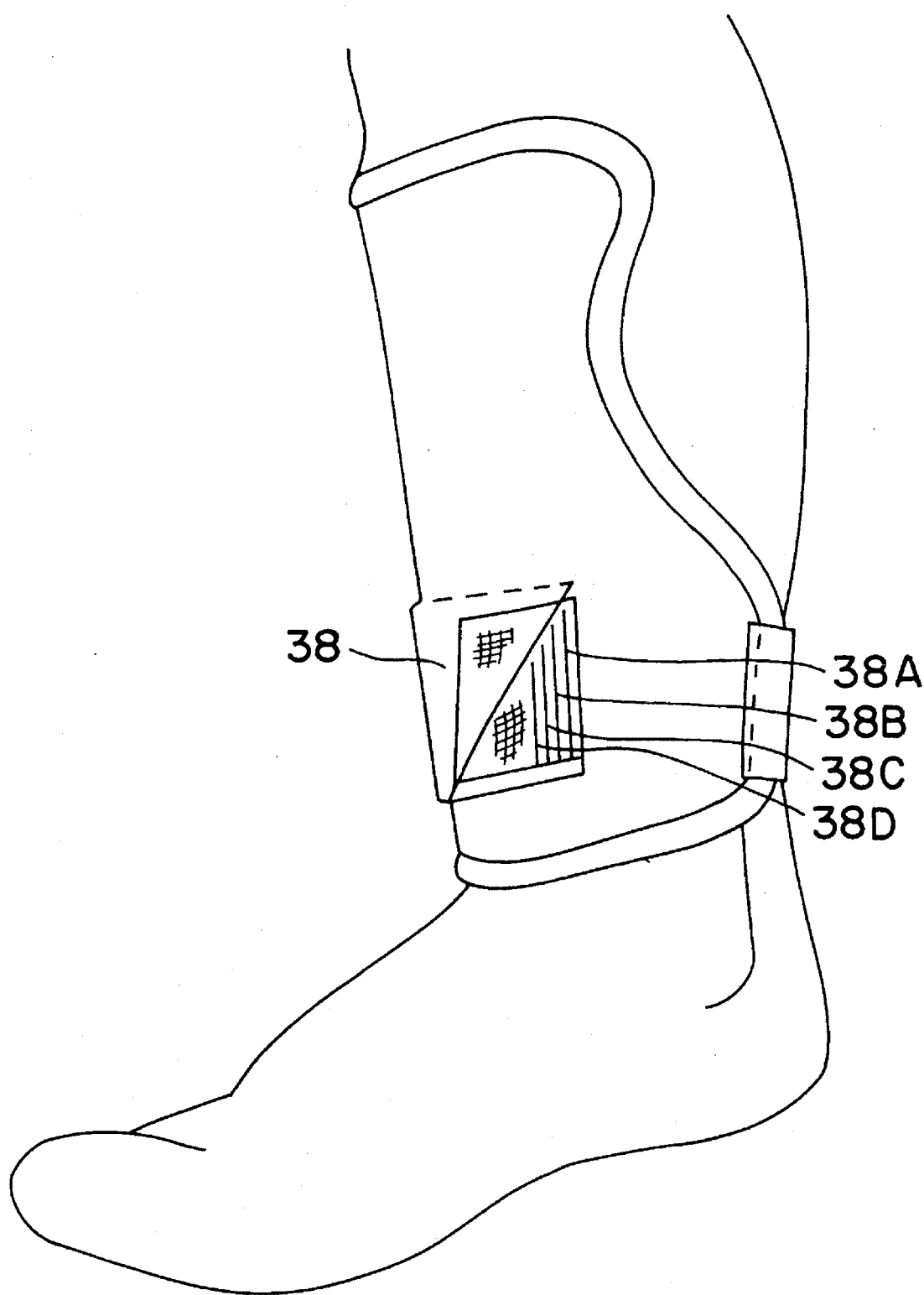
FIG. 10 is a perspective view of the embodiment of the invention shown in FIG. 9 with part of the outer layer broken away to show the additional reenforcement.

In addition, a supplemental reenforcement pad 38 is applied to the front portion of the shin guard 30 at the area of the shin just above the top of the foot. As is shown in FIG. 10, reenforcement pad 38 is formed of an additional four layers of fiberglass fabric 38A–D. Each of the layers 38A–D are the same size and overlie each other in substantial registration with each other. The fiberglass fabric of the layers 38A–D is impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure along with the other layers of fiberglass 36A–F of the intermediate layer 35. Thus, in the area of the reenforcement pad 38 there are ten overlying layers of fiberglass—six in the intermediate layer 35 and four in the impact pad 38.

Figure 11:
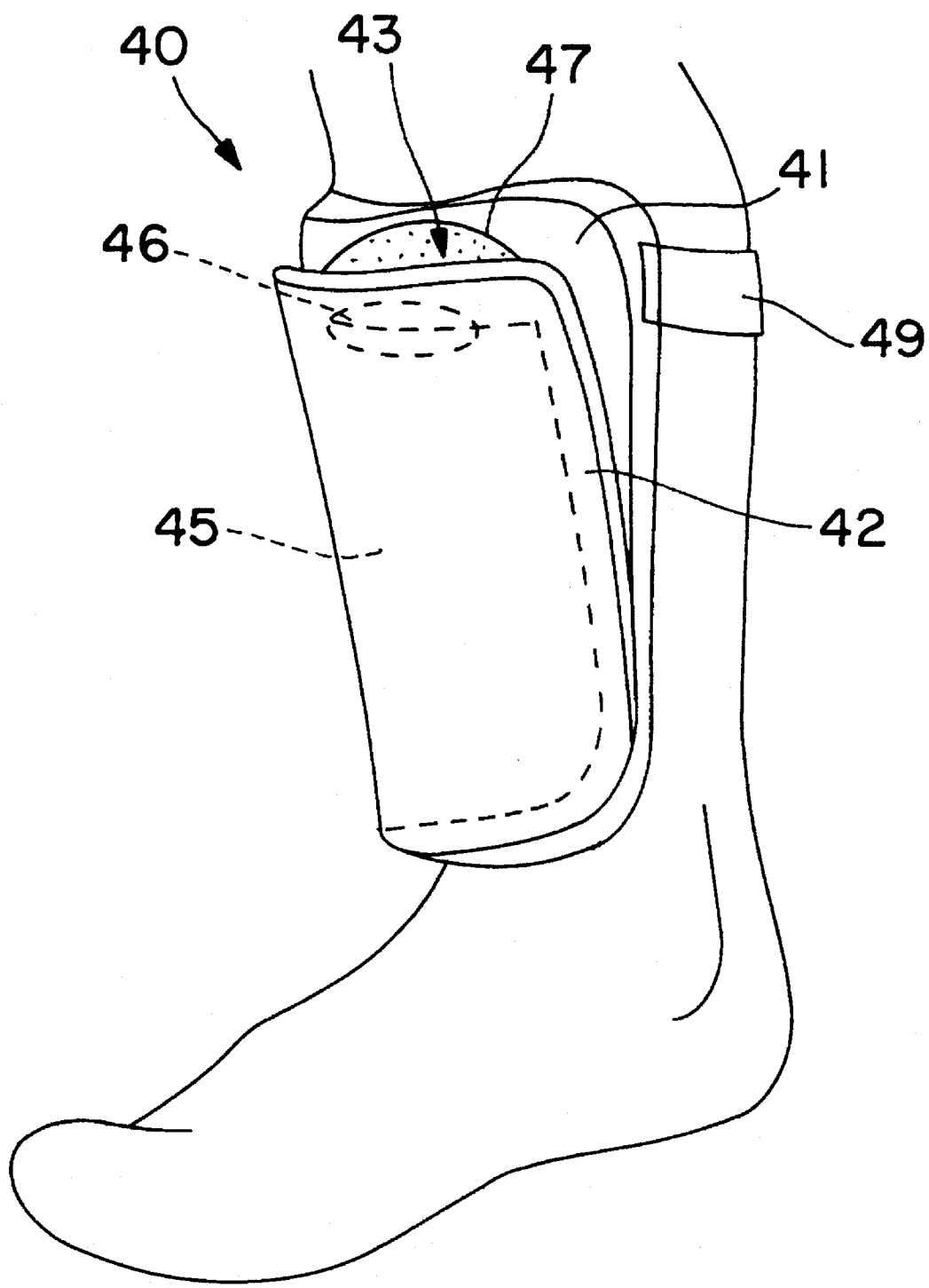
FIG. 11 is a perspective view of an embodiment of the invention which acts as a replaceable protective padding insert in a pad cover.
Figure 12:
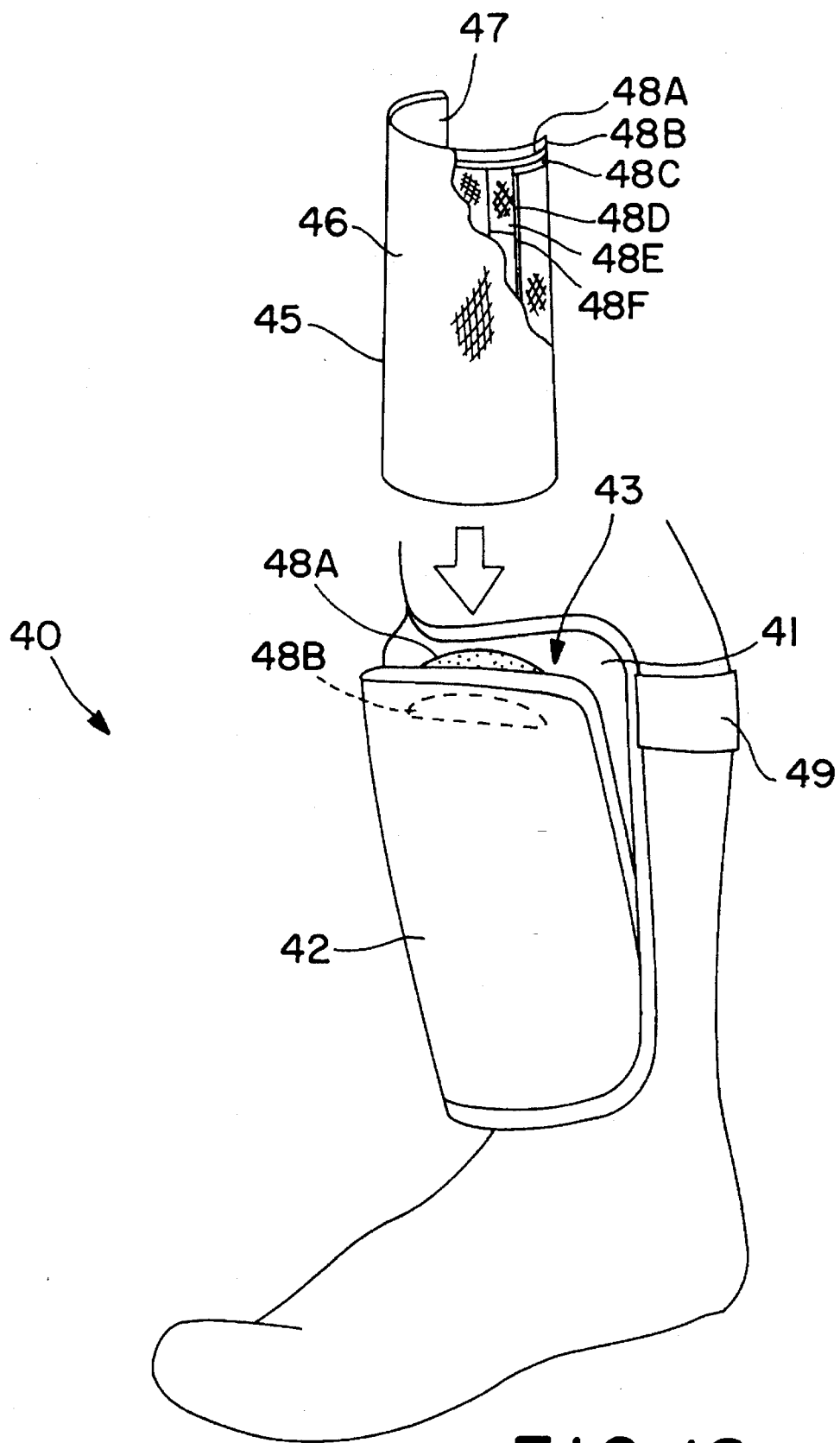
FIG. 12 is a perspective view, with parts broken away, of an embodiment of the invention as shown in FIG. 11.

Referring now to FIGS. 11 and 12, a shin guard 40 is shown. Front and back fabric layers 41 and 42 are connected together on the bottom and sides by, for example, sewing, to form a double layer fabric structure defining a pocket. The pocket is accessed by a top access opening 43 to permit insertion of and removal from the pad cover of a protective pad 45 according to the invention. The pad 45 includes inner and outer cover layers 46 and 47 enveloping an intermediate layer 48 formed of a plurality of layers of fiberglass fiber 48A–F impregnated with a moisture-reactive resin system as described above. The protective pad 45 may be molded to the leg separately as described above and then used in connection with the shin guard 40 or first placed in the pocket of the shin guard 40 while still flexible and molded to the leg while in the shin guard 40. Since the moisture-reactive system affects only the pad 45, the flexibility of the shin guard 40 is not affected.

As is shown in FIG. 12, the protective pad 45 is inserted into the pocket formed by the front and back fabric layers 42 and 41. Complementary male and female hook and loop fastener members 48A and 48B sewn onto the front and back fabric layers 42 and 41 permit the pocket to be closed with the pad 45 contained in it.

A strap 49 may be used to retain the shin guard 40 snugly on the leg.

Figure 13:
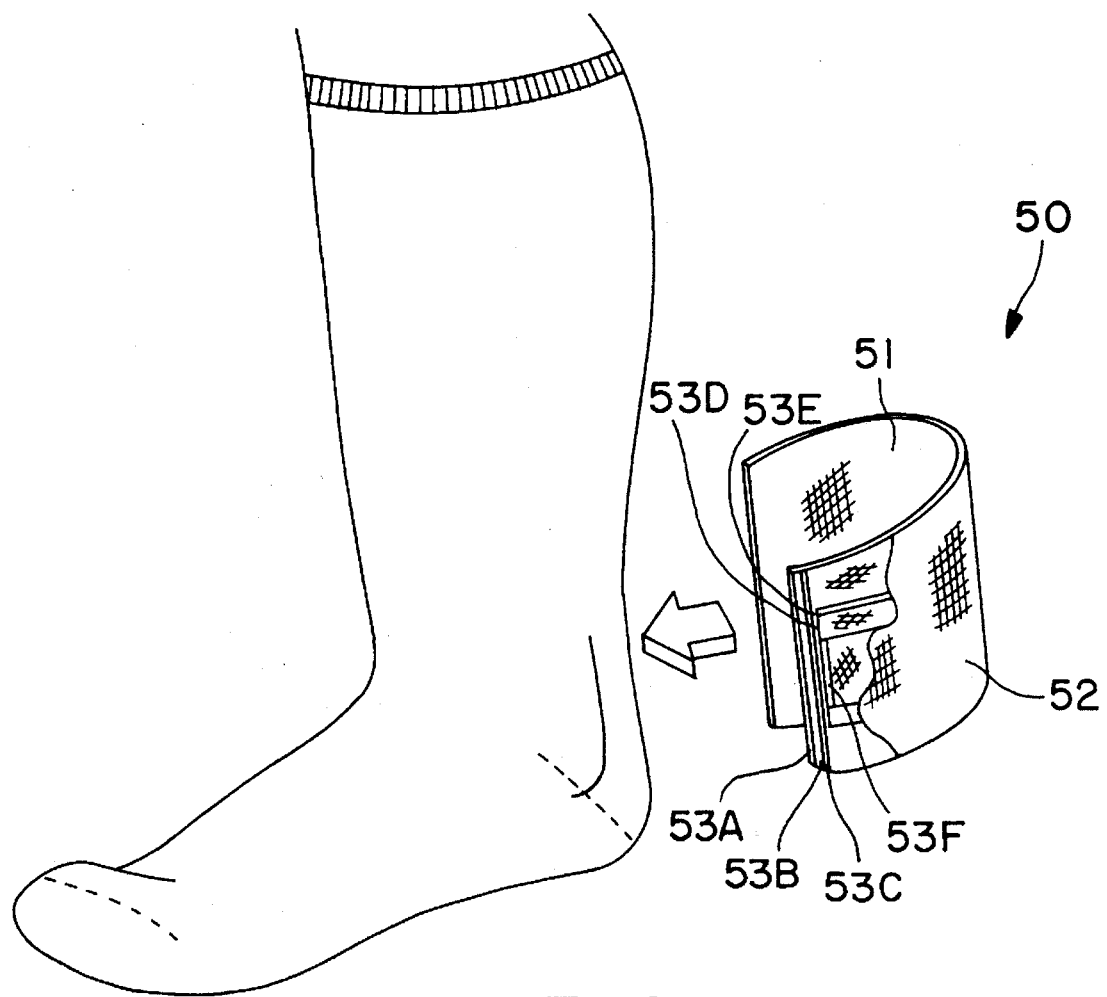
FIG. 13 is a perspective view, with parts broken away, of an achilles heel protector according to the invention.

Referring now to FIG. 13, an achilles tendon protector 50 is shown, and is intended to be molded to the back of the foot in the area of the achilles tendon. Protector 50 includes an inner cushion layer 51, and outer layer 52, and an intermediate layer 53. The intermediate layer is comprised of individual fiberglass layers 53A–F in the "pyramid" form described above.

The fiberglass fabric of the layers 53A–F is impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Protector 50 is applied to the achilles tendon area of the foot while flexible, as described above with reference to FIGS. 1–5. Once hardened, it can be placed back on the foot over an under sock and under a game sock to protect the back of the foot, and particularly the achilles tendon from impact damage. Note that whereas the above-described pads are placed on the leg with the length of the pad extending axially along the length of the leg, the achilles tendon protector 50 is placed on the foot so as to extend radially around the rear portion of the foot. The same pyramid structure described above is used in the achilles tendon protector 50, and as with the above-described pads, the layers of fiberglass extend in the lengthwise direction. Therefore, according to FIG. 13, the top and bottom of the achilles tendon protector is relatively more flexible than the central area extending around the protector from one side of the foot to the other.

The particular embodiments disclosed above are for purposes of illustration. Many other variations are possible while remaining within the scope of the invention. Several other possible constructions for the intermediate layer according to the invention are shown in FIGS. 14A–17B. In each case, the "A" illustration shows the arrangement of the multiple layers of fiberglass fabric, and the "B" illustration shows the same construction in its position as formed around a body part such as a leg.

Figure 14A:
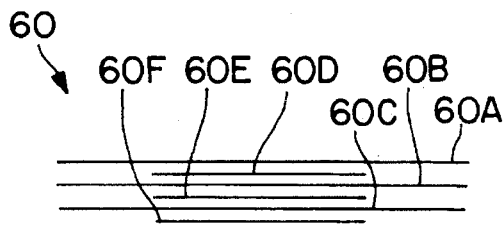
FIGS. 14A, 14B; 15A, 15B; 16A, 16B; and 17A, 17B are simplified vertical cross-sections of the intermediate layer of the protective padding of the invention according to several variations, shown in their respective unmolded and molded conditions.
Figure 14B:
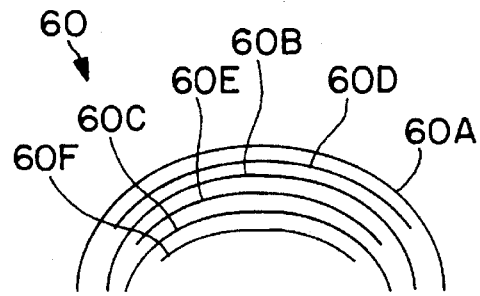

FIGS. 14A and B show an intermediate layer 60 in its original and formed configurations. Intermediate layer 60 includes separate, relatively wide fiberglass layers 60A, B and C, alternated with relatively narrow fiberglass layers 60D, E and F. These layers 60A–F are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 15A:
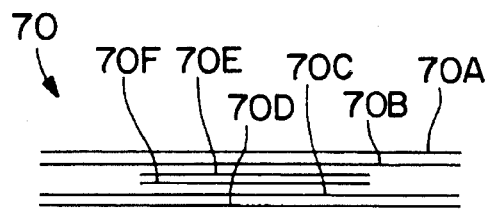
Figure 15B:
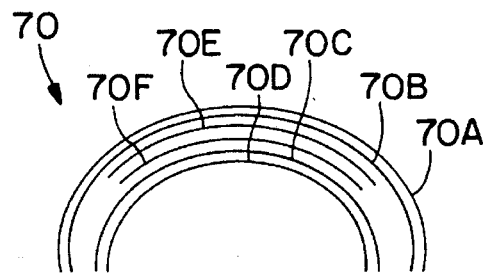

FIGS. 15A and B show an intermediate layer 70 in its original and formed configurations. Intermediate layer 70 includes separate, relatively wide fiberglass layers 70A, B, C and D, with two narrow fiberglass layers 70 E and F positioned in the middle of the layer 70 between fiberglass layers 70B and C. The fiberglass layers 70A–F are impregnated or coated with a moisture-curable curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 16A:
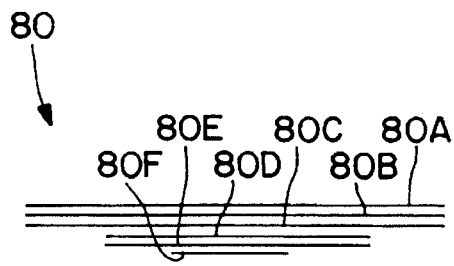
Figure 16B:
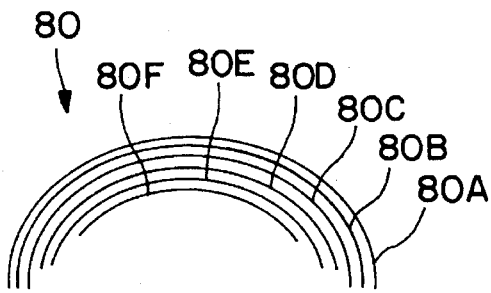

FIGS. 16A and B show an intermediate layer 80 in its original and formed configurations. Intermediate layer 80, very similar to the one shown in FIGS. 6 and 7, but is included to illustrate that the relative dimensions of the various layers can vary with respect to each other, even though the overall configuration of the intermediate layer stays the same. In FIGS. 16A and 16B the narrower layers decrease in width to a greater degree than in the example shown in FIG. 6 and 7. Whereas in FIGS. 6 and 7 the layers are five, four and three inches wide, respectively, in FIGS. 16A and 16B, the layers 80A, B and C are five inches, whereas the layers 80D and E are three inches, and the innermost layer 80F is two inches wide. The layers 80A–F are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

Figure 17A:
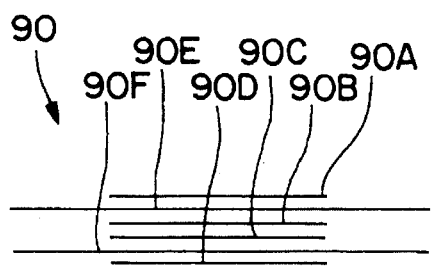
Figure 17B:
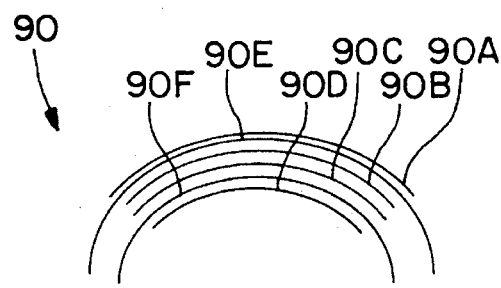

FIGS. 17A and B show an intermediate layer 90 in its original and formed configurations. Intermediate layer 90 includes separate, relatively narrow fiberglass layers 90A, B, C and D, with two relatively wide fiberglass layers 90E and F positioned in the middle of the layer 90 between fiberglass layers 90A and 90B, and 90C and 90D, respectively. The fiberglass layers 90A–F are impregnated or coated with a moisture-curable resin such as polyisocyanate as described in full in the present applicant's U.S. Pat. No. 4,770,299 and above. The reactive system remains stable when maintained in substantially moisture-free conditions but hardens upon exposure to sufficient moisture to form a rigid, self-supporting structure.

The number of layers of fiberglass in the intermediate layer can be varied to take into account anticipated use conditions. Also, as mentioned above, other materials such as polypropylene can be used in substitution for some of the layers. Also, even though the stitches by which the layers are held together are not shown in FIGS. 14A–17B, it is understood that the layers will be stitched together with wide, loose stitches to keep the layers together as a unit while permitting shifting as needed permit the layers to conform to the curvature of the body part to which the pad is being molded.

A protective pad according to several varying embodiment for being molded onto a body part to be protected is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A multi-layer protective pad for being custom-fitted to a body member to be protected, comprising:

(a) a flexible inner cushion layer for being placed closest to the body member;

(b) an initially flexible intermediate layer bonded to the inner layer, said intermediate layer comprised of a fabric impregnated with a moisture-curable resin which hardens upon curing to form a rigid structure of the fabric which retains a body part-defined shape into which it is molded during curing, thereby also holding the flexible inner cushion layer in the same body-part defined shape, said fabric having a variable thickness with a relatively thick predetermined area where increased rigidity is desirable and a relatively thin area where increased flexibility is desirable; and (c) a flexible outer layer bonded to the intermediate layer for being held by the intermediate layer in the same body-part defined shape as the intermediate layer.

2. A body part protective pad according to claim 1, wherein said fabric comprises a plurality of overlaid thicknesses of fiberglass.

3. A body part protective pad according to claim 2, wherein said plurality of thicknesses of fiberglass comprises at least five thicknesses and no more than seven thicknesses.

4. A body part protective pad according to claim 2, wherein said fiberglass thicknesses are sewn together with stitches in order to provide stability to the protective pad during molding.

5. A body protective pad according to claim 4, wherein said stitches extend along the length of the intermediate layer closer to one side edge of the intermediate layer than the other.

6. A body protective pad according to claim 1, wherein said stitches are sufficiently loosely placed in the intermediate layer to permit substantial shifting of the individual layers relative to each other as the intermediate layer is formed around the body part to be protected.

7. A body protective pad according to claim 3, wherein said intermediate layers of fiberglass include:

(a) at least one relatively wide layer;

(b) at least one intermediate layer residing next to said relatively wide layer and having a width no more than 90 percent of the relatively wide layer; and (c) at least one relatively narrow layer residing next to said intermediate layer and having a width no more than 90 percent of the intermediate layer.

8. A body protective pad according to claim 7, wherein said intermediate layer has a width of no more than 80 percent of the relatively wide layer, and wherein said relatively narrow layer has a width of no more than 80 percent of the intermediate layer.

9. A body protective pad according to claim 8, wherein said intermediate layer has a width of no more than 60 percent of the relatively wide layer, and wherein said relatively narrow layer has a width of no more than 67 percent of the intermediate layer.

10. A body protective pad according to claim 7, wherein the relatively wide, intermediate and relatively narrow layers are positioned to be conformed around a generally cylindrical body part such as a leg or arm to define a convex first major surface residing adjacent the body part and a concave second major surface residing remote from the body part, the relatively wide layer residing on the surface of the convex major surface and the relatively narrow layer residing on the concave major surface.

11. A body protective pad according to claim 3, and including a supplemental reenforcement area defined by a plurality of overlying supplemental layers of fiberglass.

12. A body protective pad according to claim 1, 2, 3, 4, 5, 6, 7, 8, 9, 10 or 11, wherein said body protective pad comprises a shin guard, said shin guard having:

(a) a relatively narrow center portion for being placed on and formed to the shin; and (b) first and second integrally-formed side portions extending outwardly from said center portion for being placed on and formed to the leg on opposing sides of the shin.

13. A body protective pad according to claim 12, wherein said shin guard includes strap means attached thereto for securing the shin guard around the leg.

14. A body protective pad according to claim 1, 2, 3, 4, 5, 6, 7, 8, 9, 10 or 11, and including a pad cover for enclosing the protective pad and holding it in place on the body part, said pad cover comprising:

(a) front and back fabric layers connected together to form a double layer fabric structure;

(b) access means formed in said pad cover to permit insertion of and removal from said pad cover of the body protective pad; and (c) strap means attached thereto for securing the pad cover and the protective pad therein on the body part to be protected.

15. A body protective pad according to claim 14, and including closure means for closing the access means to trap the protective pad therein.

16. A body protective pad according to claims 1, 2, 3, 4, 5, 6, 7, 8, 9, 10 or 11, and comprising an achilles tendon protector for being placed on and formed to the back of the foot in the area of the achilles tendon.

17. A multi-layer protective pad assembly for preparing a protective pad custom-fitted to a body part to be protected, and comprising:

(a) a flexible inner cushion layer for being placed closest to the body member;

(b) an initially flexible intermediate layer bonded to the inner layer, said intermediate layer comprised of a fabric impregnated with a moisture-curable resin which hardens upon curing to form a rigid structure of the fabric which retains a body part-defined shape into which it is molded during curing, thereby also holding the flexible inner cushion layer in the same body-part defined shape, said fabric having a variable thickness with relatively thick a predetermined area where increased rigidity is desirable and a relatively thin area where increased flexibility is desirable;

(c) a flexible outer layer bonded to the intermediate layer for being held by the intermediate layer in the same body-part defined shape as the intermediate layer; and (d) a moisture-proof protective pouch within which elements (a), (b) and (c) are sealed in the absence of moisture until the time the pad is to be molded to the body part to be protected.

* * * * *